(12) United States Patent
Riemer et al.

(10) Patent No.: US 8,187,452 B2
(45) Date of Patent: May 29, 2012

(54) METHOD AND SYSTEM FOR MAGNETIC RECORDING MEDIA

(75) Inventors: Steven C. Riemer, Minneapolis, MN (US); Ibro Tabakovic, Edina, MN (US); Jie Gong, Eden Prairie, MN (US); Hieu T. Lam, Milpitas, CA (US); Mark T. Kief, Lakeville, MN (US); Mark H. Ostrowski, Lakeville, MN (US); Jiaoming Qiu, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 49 days.

(21) Appl. No.: 12/431,705

(22) Filed: Apr. 28, 2009

(65) Prior Publication Data

US 2010/0273026 A1    Oct. 28, 2010

(51) Int. Cl.
*B23H 11/00* (2006.01)
(52) U.S. Cl. .................... 205/666; 205/674
(58) Field of Classification Search .................. None
See application file for complete search history.

(56) References Cited

U.S. PATENT DOCUMENTS

| | | | |
|---|---|---|---|
| 4,374,009 A * | 2/1983 | Chen et al. ............... | 428/545 |
| 2006/0222898 A1 * | 10/2006 | Ichihara ................... | 428/826 |

OTHER PUBLICATIONS

Guhua Yao, Fabrication and Application of Patterned Magnetic Media, Massachusetts Institute of Technology, Dept. of Material Science, Masters Thesis, Sep. 2006.

R. Hyndman, Modification of Co/Pt Multilayers by Gallium Irradiation, Part 1: The Effect on Structural and Magnetic Properties, Journal of Applied Physics, vol. 90, No. 8, Oct. 15, 2001, 2001 American Institute of Physics.

C. T. Rettner, Characterization of the Magnetic Modification of Co/Pt Multilayer Films by He, Ar, and Ga Ion Irradiation, Applied Physics Letters vol. 80, No. 2, Jan. 14, 2002, 2002 American Institute of Physics.

Charles T. Rettner, Patterning of Granular Magnetic Media with a Focused Ion Beam to Produce Single-Domain Islands at >140 Gbit/in, IEEE Transactions on Magnetics, Vol. 37, No. 4, Jul. 2001, p. 1649.

Charles T. Rettner, Magnetic Characterization and Recording Properties of Patterned Co70Cr18Pt12 Perpendicular Media, IEEE Transactions on Magnetics, vol. 38, No. 4, Jul. 2002, p. 1725.

Ca Ross, Patterned Magnetic Recording Media, Annu. Rev. Mater. Res. 2001. 31:203-35, 2001 by Annual Reviews, Department of Materials Science and Engineering, Massachusetts Institute of Technology, Cambridge, Massachusetts 02139.

(Continued)

*Primary Examiner* — Holly Rickman (57) ABSTRACT

A patterned magnetic recording media and method thereof is provided. A recording layer comprises a continuous surface of more-noble elements and less-noble elements, such as CoXYZ, wherein X can be Pt, Pd, Ru, Rh, Ir, Os, or Au, wherein Y can be null or Cr, and wherein Z can be null, Cu, Ta, Ti, O, B, Ag, or $TiO_2$. The recording layer is masked, shielding areas for recording domains and exposing areas between the recording domains. A voltage bias establishes the substrate as an anode in the presence of Pt cathode, in an electrolyte bath. Ions of the less-noble element are anodically removed predominantly from the exposed areas of the recording layer for a controlled time. The controlled time minimizes oxidation of the nobler element and reduces undercutting of the recording domains. The article produced can have separating areas with surfaces substantially formed of the more-noble element.

23 Claims, 10 Drawing Sheets

OTHER PUBLICATIONS

B.D. Terris and T. Thomson, Nanofabricated and Self-Assembled Magnetic Structures as Data Storage Media, Institute of Physics Publishing, Journal of Physics D: Applied Physics, J. Phys. D: Appl. Phys. 38 (2005) R199-R222, 2005 IOP Publishing Ltd.

Dieter Weller and Andreas Moser, Thermal Effect Limits in Ultrahigh-Density Magnetic Recording, IEEE Transactions on Magnetics, vol. 35, No. 6, Nov. 1999, p. 4423.

\* cited by examiner

METHOD AND SYSTEM FOR MAGNETIC RECORDING MEDIA

FIELD

The invention relates generally to patterned magnetic recording storage media and methods for creating the recording domains of such media.

BACKGROUND

Magnetic data storage media includes a recording layer formed on a substrate. Data is stored on the media by changing magnetic polarities among consecutive magnetic domains in the recording layer. The domains of contemporary magnetic storage media include multiple distinct grains of a magnetic material. Denser media can be provided by forming smaller domains. However, there is a practical limit as to the extent the domains can be minimized in size and yet still be comprised of a plurality of distinct grains.

One particular effect that limits minimization of domain size is a super-paramagnetic effect. The super-paramagnetic effect occurs when the grain volume is too small to prevent thermal fluctuations from spontaneously reversing magnetization direction in the grains. One technique to delay the onset of the super-paramagnetic effect is to use bit patterned media, where each bit is a single magnetic switching volume (e.g., a single grain or a few strongly coupled grains), as described in R. D. Terris et al., *J. Phys. D: Applied Physics* 38, R199 (2005). In order to keep thermally activated reversal at an acceptable level, $K_u V/k_b T$, where $K_u$ represents the magnetic anisotropy, V represents the magnetic switching volume, $k_b$ represents the Boltzmann constant, and T represents the temperature in Kelvin. The ratio must remain greater than approximately 60 for conventional longitudinal media according to D. Weller, et al. "Thermal Effect Limits in Ultra-high-Density Magnetic Recording", *IEEE Trans. on Magnetics* 35, 4923 (1999). To maintain a sufficient SNR, it is desirable to conserve the number of grains per bit as the density is increased. The switching volume in discrete dots is equal to the bit size, and dots smaller than 10 nm can be thermally stable.

A patterning process typically consists of several steps including lithography to define the pattern, and pattern transfer onto the substrate or thin film. In general, there are two classes of pattern formation processes, additive and subtractive. In the additive process (electrodeposition and lift-off), the resist pattern is first created and then the magnetic film is deposited. In the subtractive process, the magnetic film is deposited prior to resist patterning. The pattered resist then serves as an etch mask, and the surrounding magnetic film is removed by one of a number of processes including ion milling, RIE and wet chemical etching. A commonly used process for removing magnetic materials is ion milling, which is not considered to be a selective removal process. C. Ross, "Patterned Magnetic Recording Media" *Annual. Rev. Mater. Res.* 31, 203-35 (2001).

The modification of magnetic films through Ga+ poisoning using FIB (Focused Ion Beam) has been described in the art. With this approach, perpendicular granular media based on CoPtCr was not etched, but rather poisoned by Ga+. Islands (dots) smaller than 70 nm in diameter were seen to have a domain remnant state. However, one drawback of this method is that FIB methods lack throughput to be a low-cost manufacturing method for patterned media. C. T. Rettner, et al. "Patterning of Granular Magnetic Media with a Focused Ion Beam to Produce Single-Domain Islands at >140 Gbit/in2" *IEEE Trans. on Magnetics* 37, 1649 (2001); C. T. Rettner, et al. "Magnetic Characterization and Recording Properties of Patterned $Co_{70}Cr_{18}Pt_{12}$", *IEEE Trans. on Magnetics* 38, 1725 (2002); C. T. Rettner et al. *Applies Physics Letters* 80, 2 279 (2002); R. Hyndman et al. "Modification of Co/Pt Multilayers by Gallium Irradiation—Part 1: The Effect on Structural and Magnetic Properties" *J. Appl. Phys.* 90, 3843 (2001).

Another contemporary method deposits a recording layer that includes magnetic material separated by inherently non-magnetic regions, masking a surface of the recording layer where the mask covers areas desired to be used as recording domains, and then processing the exposed regions to reduce magnetism. The inherently non-magnetic regions serve to protect and preserve the isolation of the magnetic material regions after etching away the exposed magnetic material. However, this contemporary approach calls for provision of a recording layer with multiple different materials, which substantially increases the complexity of the manufacturing process.

SUMMARY

A patterned magnetic recording media, and a method of producing patterned magnetic recording media is described herein. Aspects of the present invention include anodically removing, in selected regions, a comparatively less-noble component of an alloy, wherein the alloy is disposed as a continuous surface supported by a media substrate. The removal of the less-noble component in the selected regions causes the magnetic properties of the alloy in those regions to be degraded or destroyed. The areas of the continuous surface in which the less-noble component was not removed retain their magnetic characteristics and can be used as recording domains.

In an example embodiment, a method for the formation of patterned media comprises modifying perpendicular Hexagonal Close Packed (HCP) structured media based on (Co or Fe)X, (Co or Fe)XY, (Co or Fe)XZ or (Co or Fe)XYZ, wherein X is an element selected from a first group comprising Pt, Pd, Ru, Rh, Ir, Os, and Au, Y is an element selected from a second group comprising Cr, and wherein Z is an element selected from a third group comprising Cu, Ta, Ti, O, B, Ag and $TiO_2$. In a cobalt based recording media, selective anodic removal of Co (in forms of soluble $Co^{+2}$ salts) from the media is performed in determined regions, destroying or inhibiting the magnetization of the remaining material in those regions. The timing of the anodic Co removal is controlled to avoid excessive Pt oxidation and undercut of protected regions. A rate of anodic removal is controlled by variation in the current density or applied voltage potential. An appropriate electrolyte and concentration is selected for the anodic removal, as described herein. Further, processing can be performed to neutralize galvanic corrosion at Pt/CoPt interfaces, such as by submersion in a boric acid bath at about pH 8. Reference electrodes can be used to control and monitor the process.

In an embodiment, the magnetic film recording layer is deposited (e.g. by sputtering) on a Ru structured seed layer. A resist pattern is applied on the recording layer to expose the regions in which selective removal is to be performed, and to mask the areas to be used as recording domains. Resist patterns are selected to form recording domains of a desired size, in view of process characteristics. In an example, processes are described to substantially destroy magnetic properties by anodic Co removal, and to allow some Pt oxidation. Other processes are described that allow for some remaining magnetic capability in exposed regions, if the application for that media can tolerate some magnetic characteristic in those regions.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

The following description is presented to enable a person of ordinary skill in the art to make and use various aspects of the invention. Descriptions of specific techniques, implementations and applications are provided only as examples. Various modifications to the examples described herein may be apparent to those skilled in the art from these disclosures, and the general principles defined herein may be applied to other examples and applications by those of ordinary skill without departing from the scope of the invention. Additionally, well-known elements, devices, components, methods, process steps and the like may not be set forth in detail in order to avoid obscuring the invention.

Figure 1:
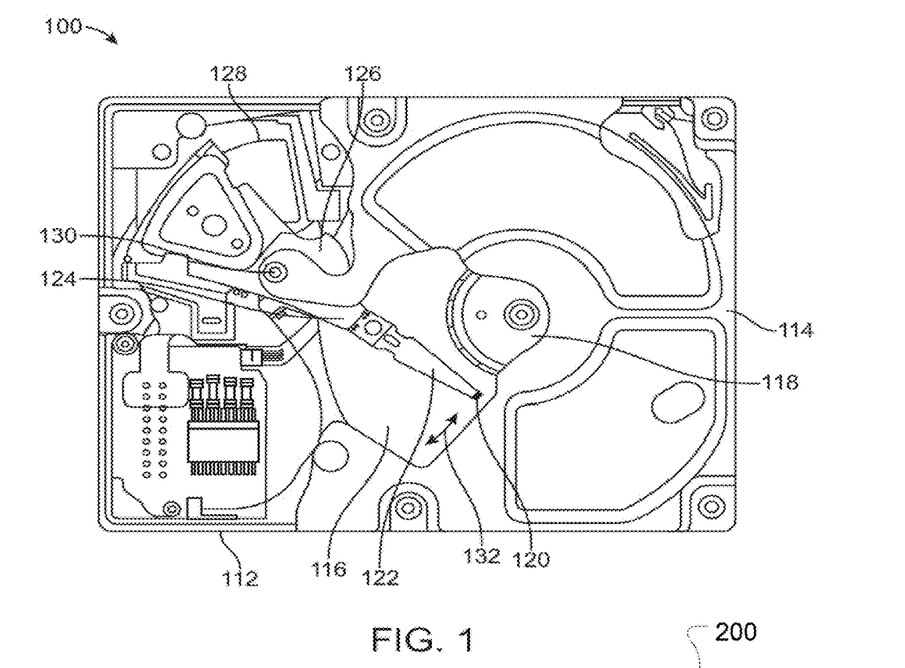
FIG. 1 is a plan view of a disc drive for data storage employing media, in which the present invention is useful, in accordance with an embodiment of the present invention.

A patterned magnetic recording media, and a method of producing patterned magnetic recording media is described herein. FIG. 1 depicts a disc drive 100 employing media for data storage, in which the present invention is useful. The disk drive 100 includes a base 112 and a top cover plate 114. The base 112 is combined with cover plate 114 to form a sealed environment to protect the internal components from contamination by elements outside the sealed environment. Disk drive 100 further includes a disk pack 116 that is mounted on a hub for rotation on a spindle motor by a disk clamp 118. Disk pack 116 includes one or more of individual disks that are mounted for co-rotation about a central axis. It will be apparent that features of the recording media, discussion and claims may be utilized with a variety of memory systems and motors, including disc drive memory systems, and low profile disc drive memory systems. The recording media teachings herein is not limited to the disc drive 100 as shown. Further, the present invention can be utilized with a variety of recording media material including-perpendicular recording media material of discrete track recording (DTR) media or bit patterned recording media (BPM), and a hexagonal close-packed (HCP) structure.

Each disk surface has an associated read/write head 120 that is mounted to the disk drive 100 for reading/writing to/from the disk surface. In the example shown in FIG. 1, read/write heads 120 are supported by flexures 122 that are in turn attached to head mounting arms 124 of an actuator 126. The actuator shown in FIG. 1 is of the type known as a rotary moving coil actuator and includes a voice coil motor, shown generally at 128. Voice coil motor 128 rotates actuator 126 with its attached read/write heads 120 about a pivot shaft 130 to position read/write heads 120 over a desired data track along a path 132. FIG. 1 is shown as a general example of a usage for the articles of media that can be produced according to the disclosed methods, and FIG. 1 implies no limitation as to the structure, components, form factor, read/write head technology or the like that may be used in devices with such media articles.

Figure 2:
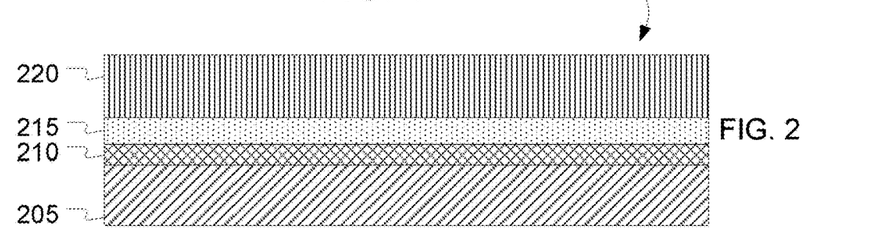
FIG. 2 is a simplified cross-sectional view of a media article, e.g. a disc, over which is disposed a layer of resist, in accordance with an embodiment of the present invention.

FIG. 2 illustrates, in simplified cross-sectional view, a portion 200 of media, such as a data disc that can be processed to produce storage media articles, in accordance with an embodiment of the present invention. The media 200 includes a substrate 205, a ruthenium seed layer 210, on which is deposited a magnetic film recording layer 215, and on which is deposited a layer 220 of resist that can, for example, be spun on and cured or dried. As an example, the recording layer 215 may be comprised of CoPt, FePt, or further alloys thereof, such as alloys of CoPt including any of Cr, Cu, Ag, Ta, Ti, O, and B. Further, in place of Pt, other elements include Pd, Ru, Rh, Ir, Os, and Au.

Substrate 205 can be formed according to known methods and from known materials, and for example can be formed from aluminum and magnesium (Al—Mg), glass, silicon, quartz sapphire, and so on. Ruthenium seed layer 210 is often used as a buffer layer between substrate 205 and recording layer 215, and helps to achieve a desired orientation in the recording layer 215. A person of ordinary skill would be able to make suitable substitutes, and omit or add further layers for supporting recording layer 215. For example, a variety of magnetically soft underlayers (SULs) can be used in magnetic recording media and can be disposed under the recording layer 215.

Figure 3:
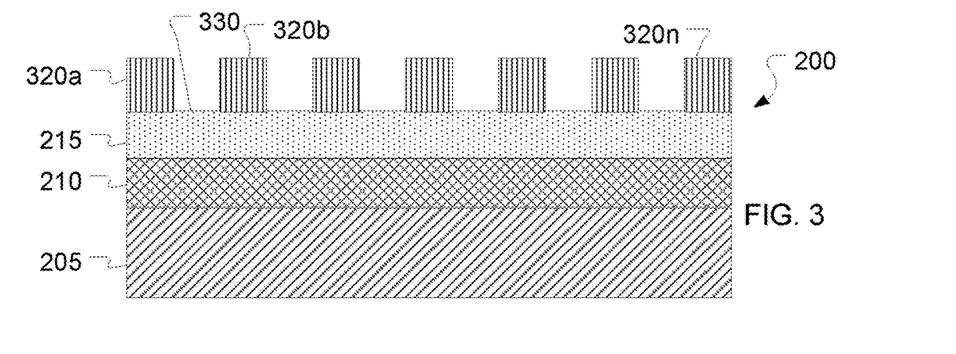
FIG. 3 is a simplified cross-sectional view of a pattern formed in the resist of the media article as in FIG. 2, in accordance with an embodiment of the present invention.

FIG. 3 illustrates a cross-sectional view of the portion 200 of media, after further processing of resist layer 220 to produce a pattern that exposes some areas of recording layer 215 and masks other areas. In particular, resist portions 320a through 320n illustrate resist mask portions, while reference number 330 identifies an exposed portion of recording layer 215. The two-dimensional layout of a surface of recording layer 215 may have any of a variety of patterns of such masking, which is not illustrated in the cross-section of FIG. 3.

Figure 4:
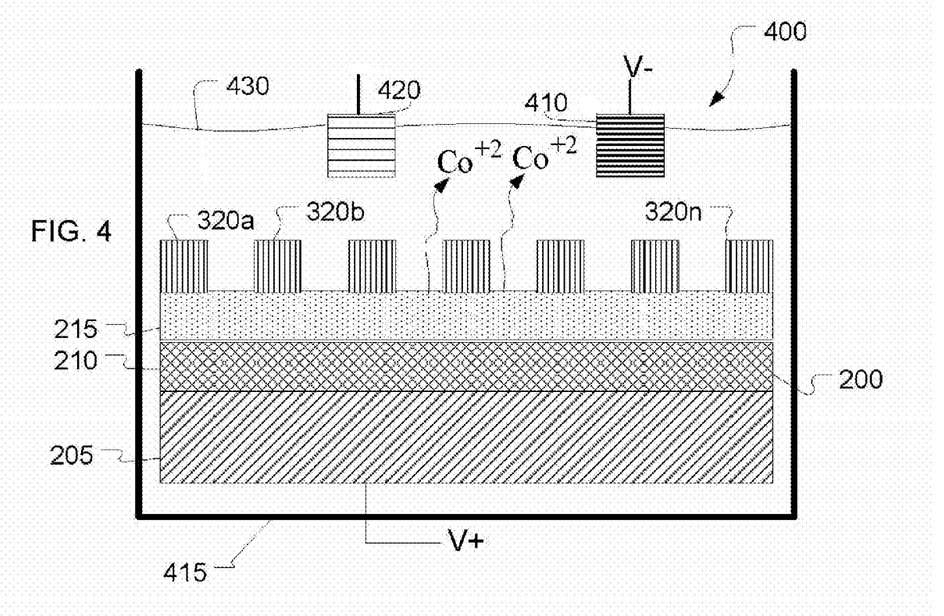
FIG. 4 is a simplified cross-sectional view of an anodic processing step of the media as in FIG. 2 and FIG. 3, in accordance with an embodiment of the present invention.

FIG. 4 illustrates a pictorial example processing setup 400 in which recording layer 215 is modified to produce bits (recording domains) separated by non-magnetic regions in a desired pattern. Setup 400 includes a container 415 in which media portion 200 can be placed. A Pt electrode 410 is biased at a negative potential with respect to media portion 200. A reference electrode 420 can be provided and formed, preferably, of calomel (mercury chloride), or of a suitable substitute, such as Ag/AgCl. An electrolyte, generally referenced by 430 is provided in container 415 at an amount sufficient to submerge at least portions of each of reference electrode 420 and Pt electrode 410 and at least the recording layer 215 of media portion 200.

As explained in further detail below, a controlled potential or current density is applied to the disc (e.g. via the illustrated voltage bias applied between media portion 200 and Pt electrode 410), which serves as an anode in an electrochemical cell with a Pt cathode and a reference electrode (such as a saturated calomel electrode). It is to be noted that a reference electrode is not a requirement of the present invention, but can allow for greater process control, and hence is desirable.

The above describes a particular example of a configuration for a Pt-based recording alloy with cobalt. More generally, other aspects include using alloys comprising a more-noble component and a less-noble component, with the more-noble element better resisting oxidation in the processing setup for the media article having the recording alloy on its surface. For example, in place of Pt, an alternative noble component of the alloy can be Pd, Ru, Rh, Ir, Os, or Au.

Figure 6:
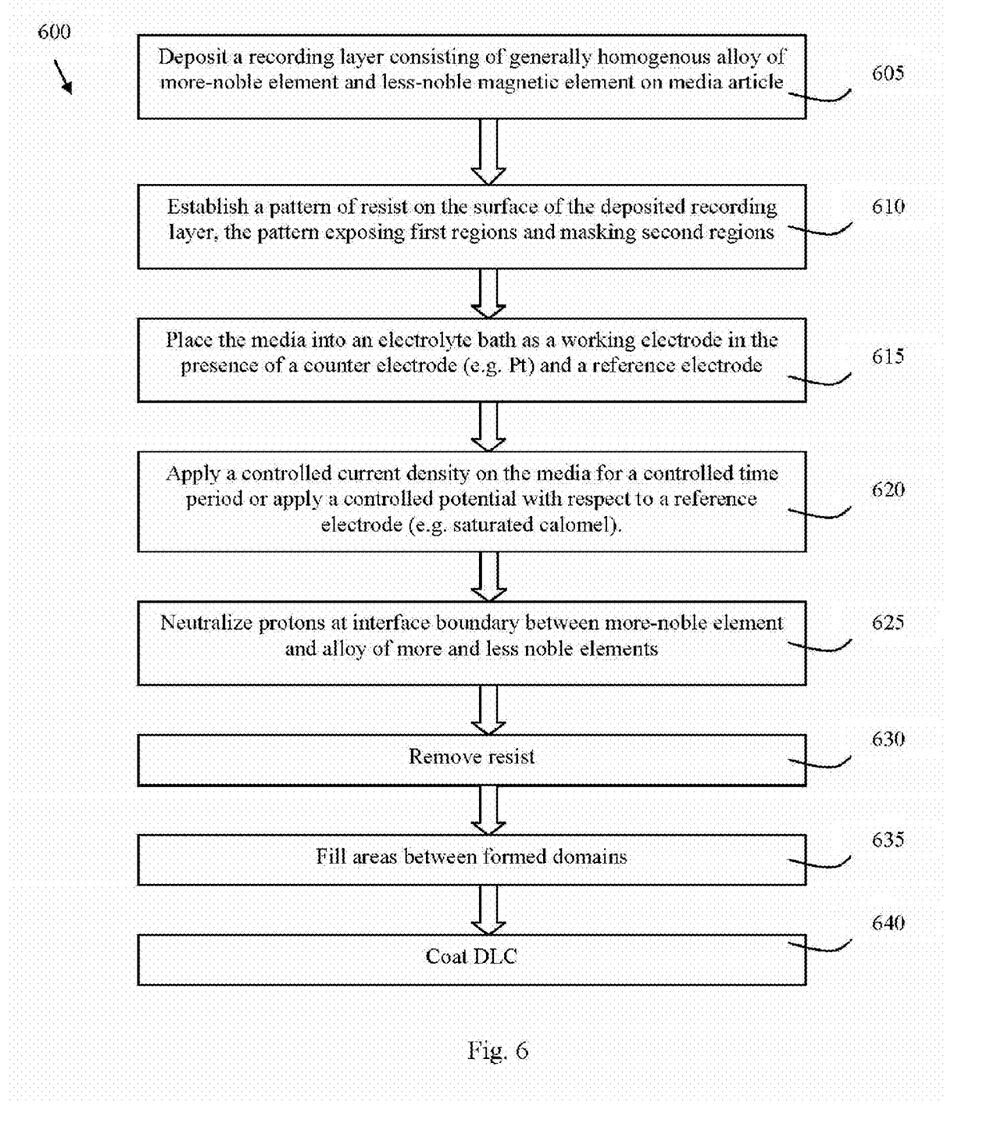
FIG. 6 is a method flow diagram illustrating processing of media articles, in accordance with an embodiment of the present invention.

FIG. 6 illustrates steps of an example method 600 for processing articles of media according to aspects of this disclosure. Elements of method 600 are explained in further detail below, but are introduced here. Method 600 includes depositing (605) a recording layer consisting of a generally homogenous alloy of a more-noble magnetic element and a less-noble magnetic element (e.g., a CoPt alloy, such as CoPtCr, and so on) on a surface of a media article, such as a substrate (or on various intervening layers that were previously deposited on the substrate, such as a Ru seed layer). Method 600 includes establishing (610) a resist pattern on the surface of the recording layer, or on a surface of a coating, such as a carbon overcoat or a Diamond Like Carbon (DLC) coating, on the recording layer. In some examples, the DLC coating can be under 10 nm thick, and in still more particular examples, under 5 nm thick, sometimes about 4 nm thick, and sometimes 2 to 3 mm thick. The resist pattern exposes first regions and masks second regions. The media article is then placed (615) or otherwise disposed in an electrolyte bath as a working electrode in the presence of a counter electrode (e.g. Pt) and a reference electrode (see, e.g. FIG. 4).

Next, a controlled current density or potential can be applied (620) to the article. As explained below, the timing and amount of current density and/or potential can be varied according to a number of criteria and considerations. After processing the article can be placed in a boric acid solution to neutralize (625) protons at interfaces between the more-noble element and the alloy (e.g., at a Pt—CoPt interface. Other methods for such neutralization may be provided, and boric acid solution is an example. Method 600 also can comprise removing (630) the remaining resist, and filling (635) of areas between the now-formed domains, which comprise mostly Pt. A DLC coating also can be applied (640). Further considerations, examples, approaches, and other information about these steps is described below.

It is to be apparent from this disclosure that methods according to this disclosure may exclude certain steps of method 600, for example, in some situations resist removal may be unnecessary, and gap filling or a DLC coating may be unnecessary, or omitted. By further example variation, proton neutralization is desirable, but not strictly necessary.

In an embodiment, two desired characteristics of the supporting electrolyte are (1) anodic removal occurs with minimal attack or without attack of a Ru layer, and (2) the supporting electrolyte causes little, minimal, or no detectable corrosion of CoPt or CoPtX in relatively brief intervals when there is no current density or voltage potential applied between Pt electrode 410 and media portion 200. Examples of electrolytes that support these characteristics comprise MCl, MBr, MI, $MNO_3$, $MHSO_4$, $M_2SO_4$, $MH_2PO_4$, $M_2HPO_4$, and $MClO_4$, wherein M comprises one of $Na^+$, $K^+$, $H^+$, and $NH_4^+$. An electrolyte meeting these characteristics is 1M KBr solution. In other circumstances, the desired characteristics for the electrolyte may be changed or reduced. For example, if the Ru layer were encapsulated or otherwise shielded from contact with the electrolyte, then (1), above, may be less needed. A further example electrolyte that may be employed is NaCl 1M pH 6, using 0.1 to 10 $mA/cm^2$ for 7.5 sec to 10 sec. NaCl solutions (1M, pH 2 to 6) are also effective electrolytes for anodic removal. Further, experiments have showed that anodic removal occurs at a lower current density and a longer time (0.265 $mA/cm^2$, 45 sec), as well as at higher current density and a shorter time (1 mA/cm2, 10 sec). In an embodiment, the same amount of Co is removed at an electrolyte pH of 6, as compared to an electrolyte pH of 2. Also, in an embodiment, the pH of the electrolyte has an effect on corrosion resistance, such that a pH of 6 shows better corrosion resistance than a pH of 2 or 4.

Figure 5:
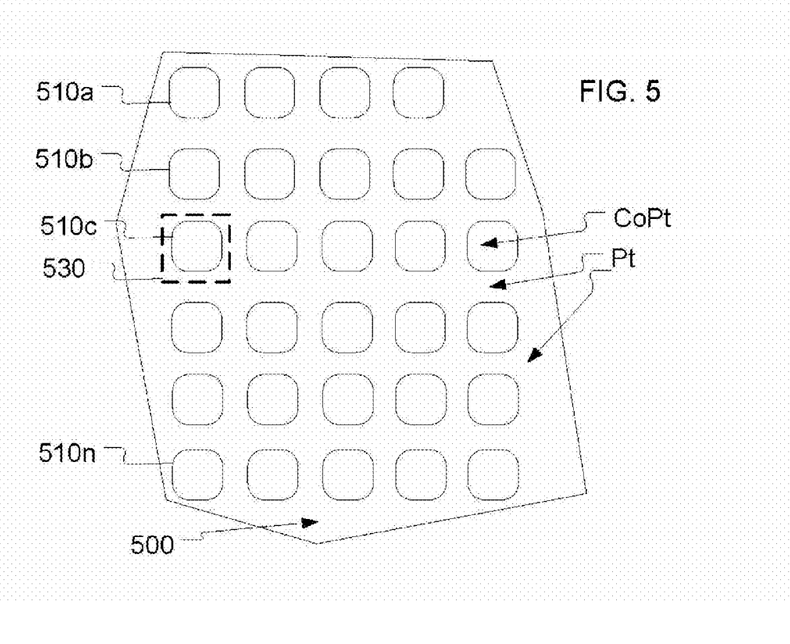
FIG. 5 is a plan view of a surface section of the media article processed, in accordance with an embodiment of the present invention.

FIG. 5 illustrates a schematic example of a surface that can result from processing according to the method of FIG. 6. In particular, the surface 500 after processing can have a number of dots (some identified 510a-510n) that provide recording domains, and are formed of grains of the magnetic recording material initially provided for support on the substrate. For example, the material can comprise grains of CoPt, CoPtCr, and so on. As an alternative embodiment to formation of dots on surface 500, trenches may be formed by the processing methods described herein. Boundaries of the recording domains are formed based on the removal of Co from areas that were not shielded, such as by a resist coating. The dashed square outline 530 identifies an example of where an original resist outline can have been provided. The recording domain outline 510c illustrates that some removal of Co around the peripheral edges of the resist portion 530 may occur, while still preserving a central portion generally unaffected by the anodic processing. As shown, the surface areas between the recording domains can be composed predominantly of Pt, Pd, Ru, Rh, Ir, Os, or Au, and also can have other materials, as described below. Further, the anodic removal of ions can be employed to remove ions from a desired number of recording layers.

Figure 7:
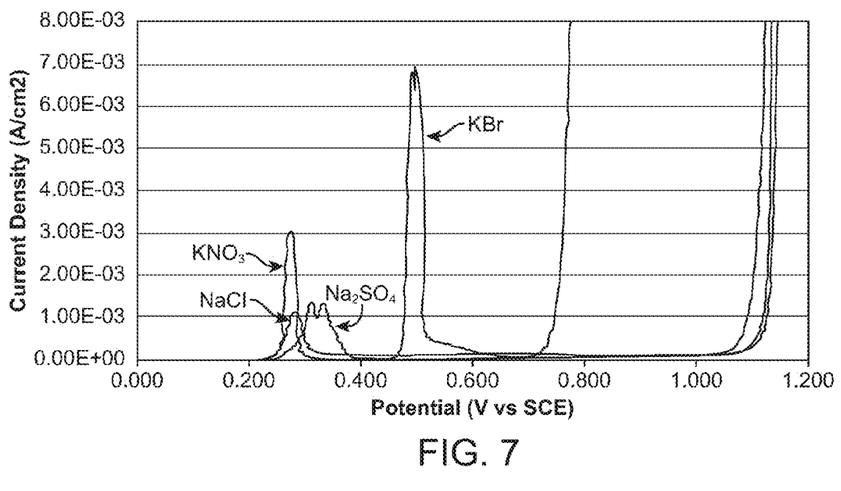
FIG. 7 is a graphical illustration of a linear sweep voltammograms of a CoPt disc in $KNO_3$, KBr, $Na_2SO_4$, and NaCl at pH 2 (5 mV/sec, no agitation, area 1 $cm^2$), in accordance with an embodiment of the present invention.

FIG. 7 shows anodic linear sweep voltammograms for the dissolution of a CoPt alloy in various potential electrolytes. These results were obtained under conditions including pH 2, 5 mV/sec sweep, no agitation, with an exposed area of 1 cm$^2$. For KBr electrolyte, the anodic limiting potential corresponds to the reaction $2Br^--2e^-\rightarrow Br_2$, which prevents the oxidation of the Ru seedlayer.

Figure 8:
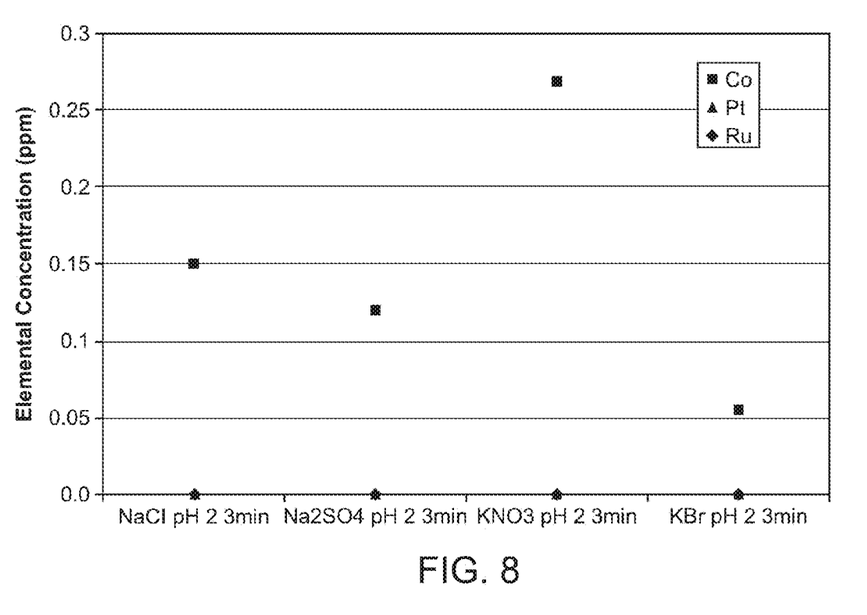
FIG. 8 is a graphical illustration of ICP-OES experimental results for dissolved metal concentrations from corrosion of CoPtRu media in 1M electrolytes at pH 2, in accordance with an embodiment of the present invention.

With further regard to item (2) above, FIG. 8 graphs elemental concentration in solution, due to corrosion (i.e., without current density or potential applied), of Co, Pt, and Ru after exposure to 1M electrolytes at pH 2. In particular, it is noted that a 1M KBr electrolyte exhibits the lowest corrosion of CoPt material, among the tested electrolytes. The concentrations were determined by Inductively Coupled Plasma Atomic Emission Spectroscopy (ICP-OES). The conditions included exposure to 1M solutions of each electrolyte for 3 minutes. In sum, a 1M KBr electrolyte provides the least corrosion during anodic "off times" of those tested, thus allowing better selectivity in removal of Co from the exposed areas of recording layer 215, as explained below. Thus, the KBr electrolyte can be preferred over the other electrolytes tested, but the others can be used as well, and more restrictive controls to limit time in the bath can be implemented as desired.

Further methods of inhibiting media corrosion include electrodeposition of nonmagnetic material from the anodic removal electrolyte, plating a nonmagnetic metal or metal alloy on a media track after the anodic removal, utilizing remaining residual nonmagnetic material within a media trench, and utilizing corrosion inhibitors with the media track including benzotriazole and methyl-benzotriazole to inhibit corrosion before and after the anodic removal. In particular, Benzotriazole (BTA) at 0.01M can be used in processing solutions to inhibit media corrosion at all times before, during and after anodic removal. Further, it was found that the BTA does not significantly affect the rate of anodic removal at high potentials >+0.8V.

Figure 9:
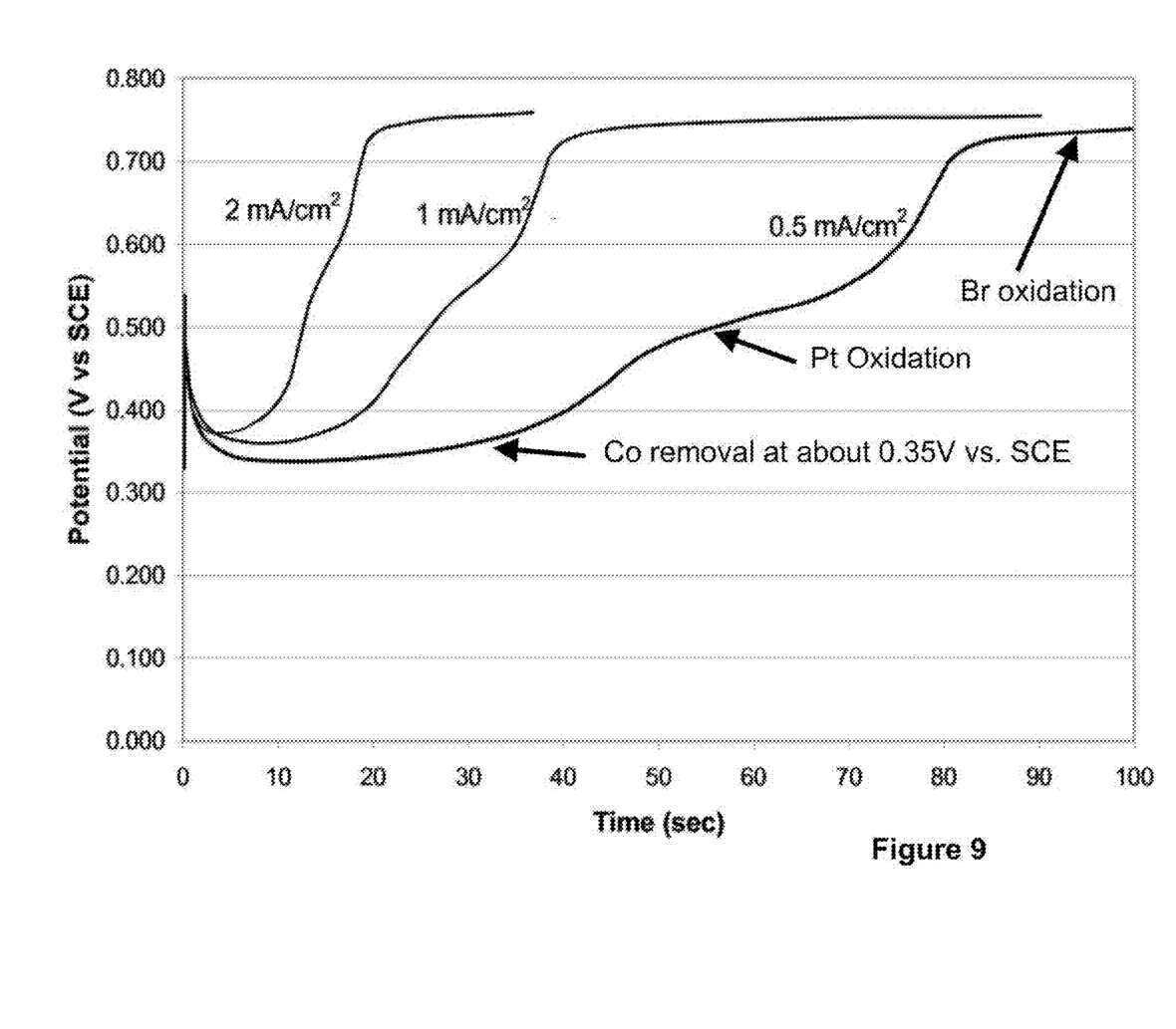
FIG. 9 is a graphical illustration of constant current removal of Co from 1 $cm^2$ areas in KBr 1M pH 2 at sampled current densities, in accordance with an embodiment of the present invention.

The selective removal of Co (as cobalt ions, such as $Co^{+2}$) from alloys including Co and Pt was demonstrated by chronopotentiometry measurements, such as those depicted in FIG. 9. Respective lines show respective oxidation of a magnetic alloy at three different constant current densities (2 mA/cm$^2$, 1 mA/cm$^2$, 0.5 mA/cm$^2$) performed in 1M KBr solution at pH 2. FIG. 9 generally illustrates respective gradual increases (higher current densities cause quicker increase in potential) in potential (with reference to a Standard Calomel Electrode (SCE)—e.g. electrode 420).

Each current density line has plateau regions, and those of the lowest current density of 0.5 mA/cm$^2$ are most apparent. As explained below, these plateaus provide evidence that Co can be selectively removed in an anodic process from a CoPt alloy. The lower potential, at approximately 0.35v vs. SCE, corresponds to the selective removal of Co in its oxidized form (e.g., $Co^{+2}$ ions). The higher plateau, at approximately 0.5V vs. SCE, corresponds to the oxidation of Pt. The third potential plateau, at approximately 0.7V vs. SCE corresponds to the oxidation of Bromide ions. Confining the joint selection of processing times and current density to areas where there is cobalt removal, but less platinum removal is a preferred approach. A lower current density can allow better process control, in that the process need not be as precisely timed as for higher current densities, but requires somewhat longer processing times. Also, this figure illustrates that the progress of Co removal can be monitored by monitoring the measured potential, which allows for higher throughput processes.

Figure 10:
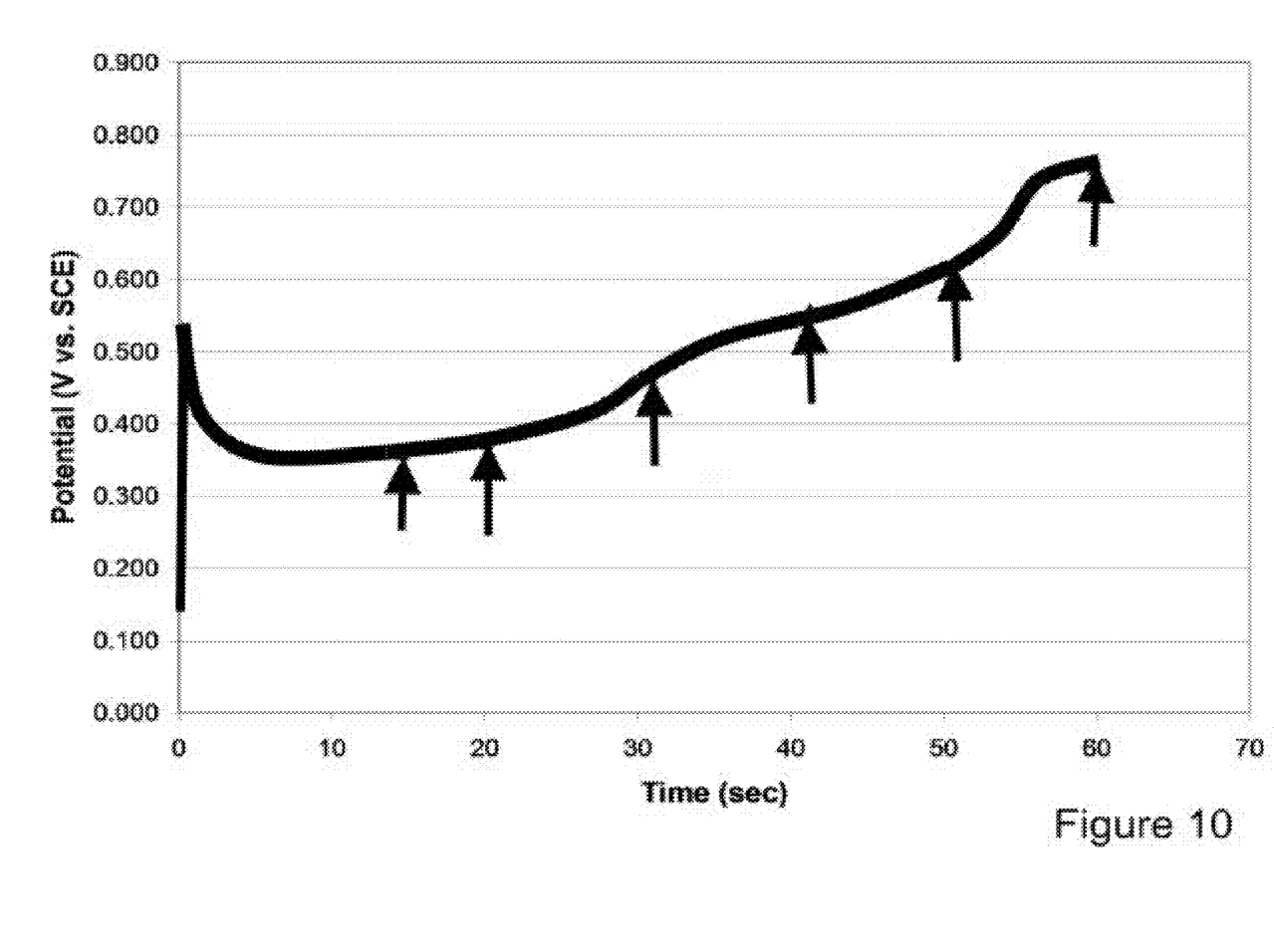
FIG. 10 is a graphical illustration of potential vs. time in a preparative cell at 1 mA constant current with exposure of 1.2 $cm^2$, in accordance with an embodiment of the present invention.

FIG. 10 is a graphical illustration of a potential versus time, similar to the setup of FIG. 9, but with a finer time scale to better illustrate potential change over time. The graph of FIG. 10 employed an exposed area of 1.2 cm$^2$, and the electrolyte was 1M KBr. The arrows indicate points at which a sample of the solution was taken in order to analyze ion concentrations to confirm selective removal of Co from CoPt. The solution samples were analyzed using ICP-OES.

Figure 11:
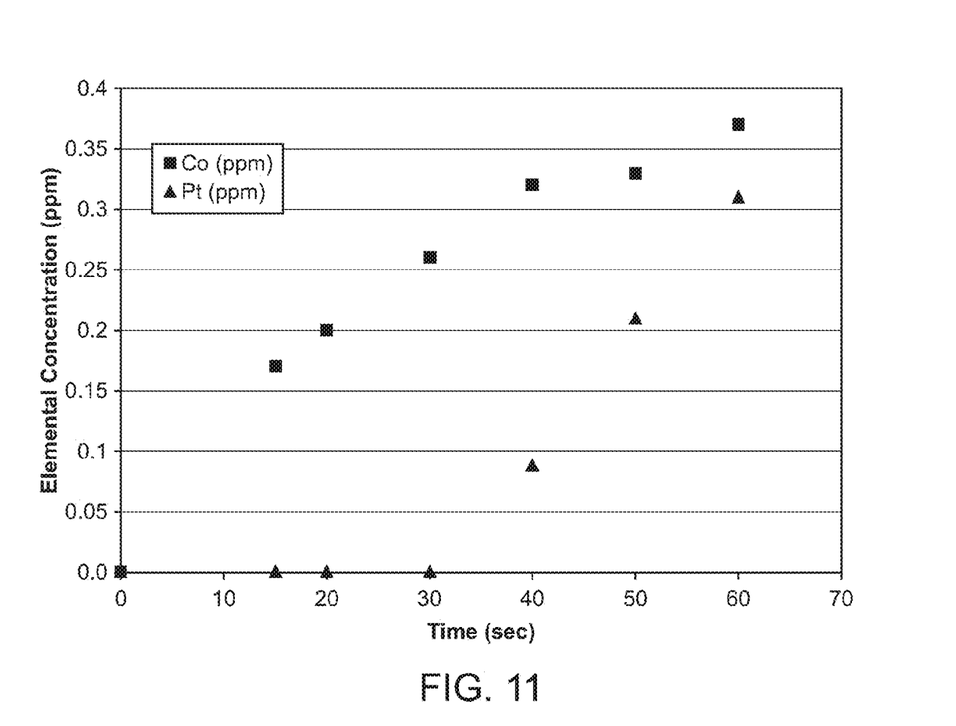
FIG. 11 is a graphical illustration of ICP-OES results for elemental concentration (ppm) of Co and Pt at 1 mA constant current with exposure of 1.2 $cm^2$ at sampling points indicated in FIG. 10, in accordance with an embodiment of the present invention.

FIG. 11 illustrates a graph of detectable ionic concentration of each of Co and Pt for the samples taken at the times illustrated in FIG. 10. It is shown that detectable amounts of Pt are not removed at least during the first 30 sec under these conditions, and when the measured potential is less than approximately 0.5V vs. SCE.

Thus, these results show that examples of current density in the range of about 0.5 mA/cm$^2$ to about 2.0 mA/cm$^2$ can be selected. Other current densities in addition to this range can be determined as being acceptable by experimentation according to the disclosures presented, and therefore also fall within the scope of examples of the invention.

Figure 12:
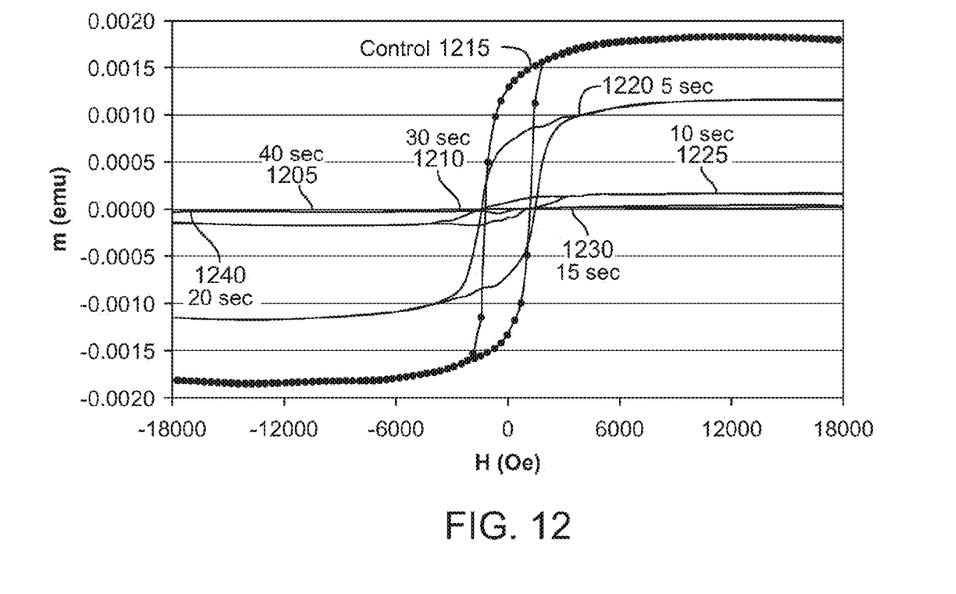
FIG. 12 is a graphical illustration of VSM measurements of various samples after selective anodic removal of Co from $Co_{82}Pt_{18}$ alloy, in accordance with an embodiment of the present invention.

FIG. 12 illustrates results of Vibrating Sample Magnetometer (VSM) measurements of different samples after selective anodic removal of Co from $Co_{82}Pt_{18}$ alloy (such as by the experiment shown in FIG. 10). These results demonstrate complete destruction of magnetization of the $Co_{82}Pt_{18}$ films after 40 sec can be realized, and that the selective removal of cobalt functions can be used to create domains of magnetic material separated by non-magnetic material. Thus, the material remaining after selective Co removal is not capable of being magnetized to any appreciable degree, and thus can serve as a separator between magnetic domains for data storage.

In particular, FIG. 12 illustrates the progressive deterioration in magnetic capability of a processed region. The recognizable hysteresis curve identified as 1215 shows magnetic performance of the control sample, which had no processing. The curve identified as 1220 shows the magnetic performance of the processed region after 5 seconds of processing. The curve identified as 1225 shows a much degraded magnetic capability after 10 seconds of processing. The graph illustrates curves for 15 seconds (1230), 20 seconds (1240), 30 seconds (1210) and 40 seconds (1205); however, they all are clustered close to the X axis, demonstrating no appreciable magnetic capability remains in any of these samples.

For these purposes, it is also the case that some platinum removal can be permitted, but such removal should be limited to what occurs incidentally to degrade the magnetic characteristics sufficiently to serve as a separation region. In some case, such degradation need not cause a degree of degradation such that no magnetizability remains, but instead, a degree of degradation appropriate for a particular purpose can be determined. For example, a particular application may only require a magnetic moment of separation regions to be ⅔ or less, or ½ or less, of the magnetic moment of the storage domains. Based on this disclosure, a person of ordinary skill would be able to select a degree of selective Co removal appropriate for the desired application.

Figure 13A:
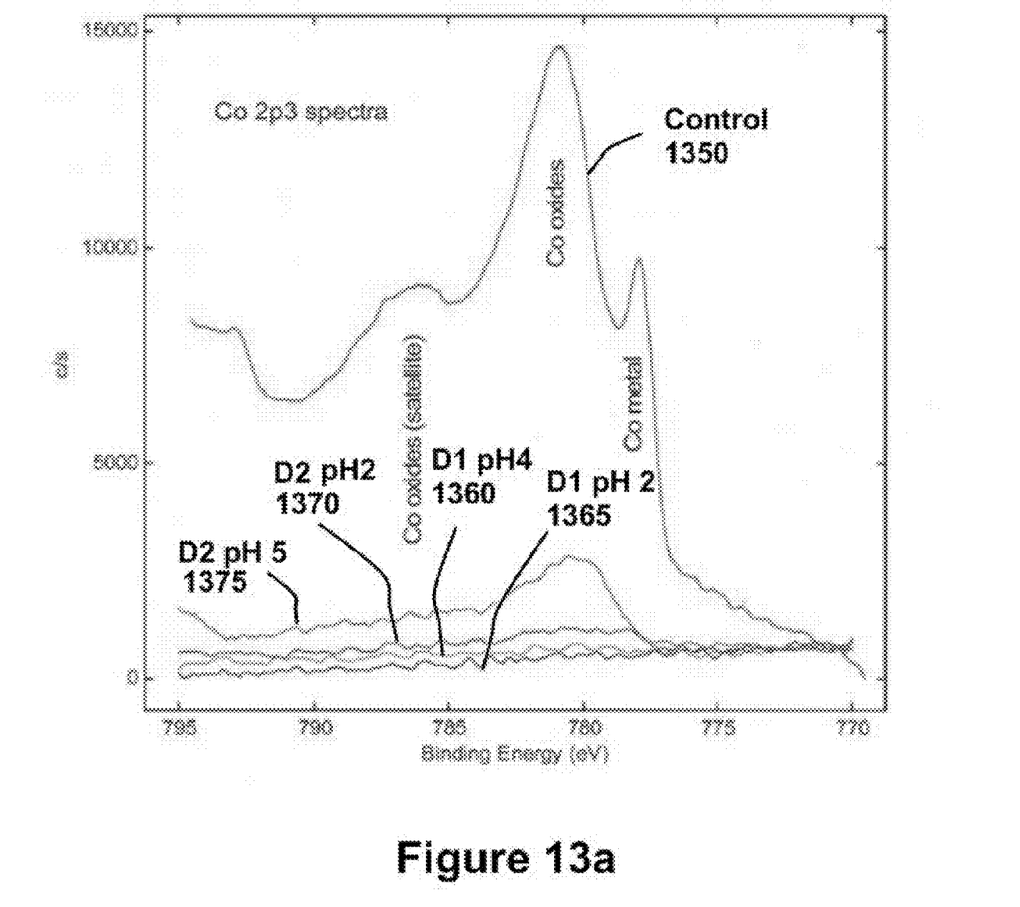
FIG. 13a is a graphical illustration of Co 2p3 spectra XPS spectra of samples after selective removal of Co from $Co_{82}Pt_{18}$ alloy at pH 2 to 5, in accordance with an embodiment of the present invention.
Figure 13B:
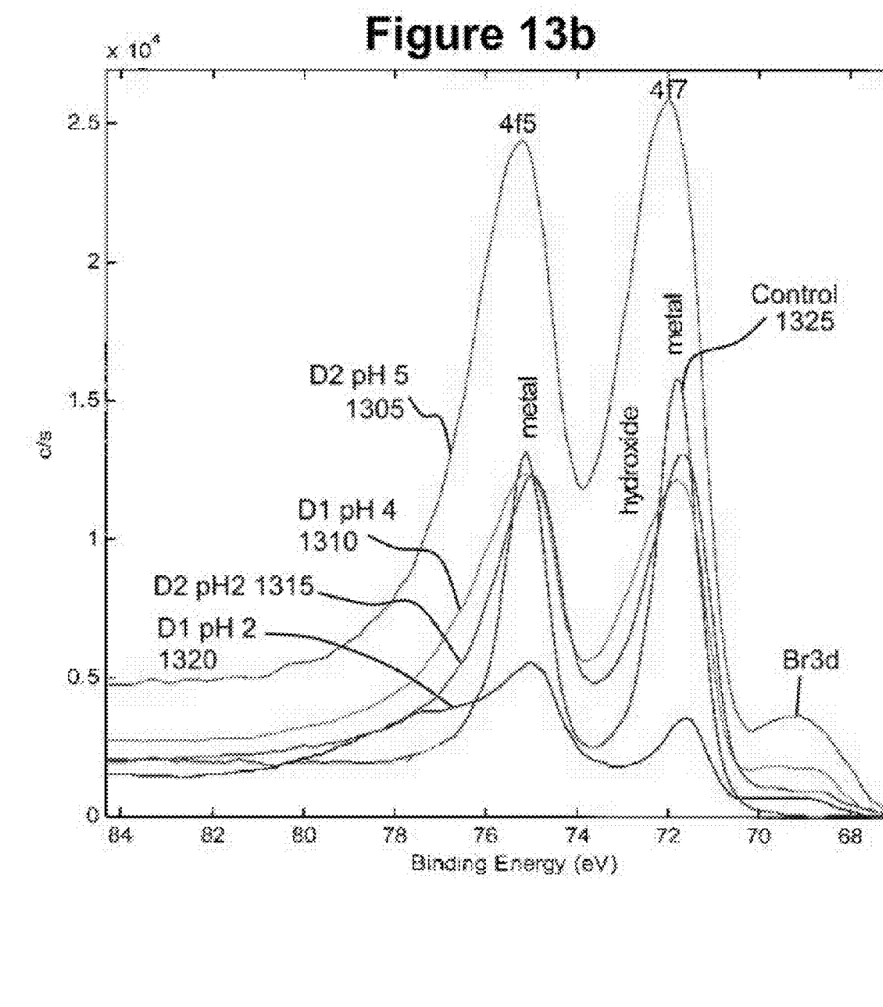
FIG. 13b is a graphical illustration of Pt 4f spectra XPS spectra of samples after selective removal of Co from $Co_{82}Pt_{18}$ alloy at pH 2 to 5, in accordance with an embodiment of the present invention.

FIGS. 13a and 13b depict results of X-Ray Photoelectron Spectroscopy (XPS) analysis of non-magnetic material remaining after selective removal of Co from a $Co_{82}Pt_{18}$ film. FIG. 13a shows cobalt XPS spectra for a control disc and samples from a plurality of processing conditions. The unprocessed control disc results evidence a disc surface primarily comprising cobalt oxides and metallic cobalt. By contrast, all the processed samples demonstrate a large reduction in the presence of metallic cobalt on the surface of the respective samples; they also evidence reduction of cobalt oxides. However, magnetic properties are determined more by metallic cobalt than its oxides.

In particular, FIG. 13a depicts Co 2p3 spectra for different processed samples, and a control without processing. The control 1350 shows a strong peak associated with surface cobalt oxide, another peak associated with cobalt metal, and a lesser peak also associated with cobalt oxides. Two measurements were taken using a first disk (D1) processed at different pHs, 2 and 4, respectively labeled 1365 and 1360. These measurements show a relatively flat spectra for both samples, demonstrating that the processed areas no longer have strong spikes associated with cobalt. Two measurements were taken using a second disk having different regions processed at two different pHs, 2 and 5, respectively identified as 1370 and 1375. The less basic pH 5 sample had a slight spike in the vicinity of what would be expected for cobalt oxide/metal. However, it also is substantially less prominent than the control. Thus, these results further demonstrate the effectiveness of the anodic processing to remove cobalt from processed regions at pHs from around 2 through 5. Of course, it is apparent that even at pH 5, substantial removal of cobalt occurs, such that pHs outside of these ranges also can be verified by further experiments according to this disclosure, and would be within the scope of such embodiments. As an example, when using an electrolyte such as KBr or NaCl, a pH of 2 to 6 is effective to remove Co, but when using NaCl, a pH of 2 can cause more corrosion than a pH of 6.

FIG. 13b depicts Pt 4f5 and 4/7 spectra for the samples described initially with respect to FIG. 13a. From the results of FIG. 13b, it appears that the surface of the D2 pH5 (1305) sample exhibits strong Pt peaks, while the D1 pH 4 (1310), D2 pH2 (1315) samples all exhibit Pt peaks roughly similar to the control sample 1325. The D1 pH2 (1320) sample exhibits lower Pt peaks than the control and the other processed samples. FIG. 13b also evidences that some impurities, such as Pt-bromides and Pt-hydroxides, can be produced during processing, as identified by the Br3d peak in the control D2 pH 5 (1305) line. FIGS. 13a and 13b in conjunction show that Co can be removed selectively from a CoPt alloy according to this disclosure.

Figure 14:
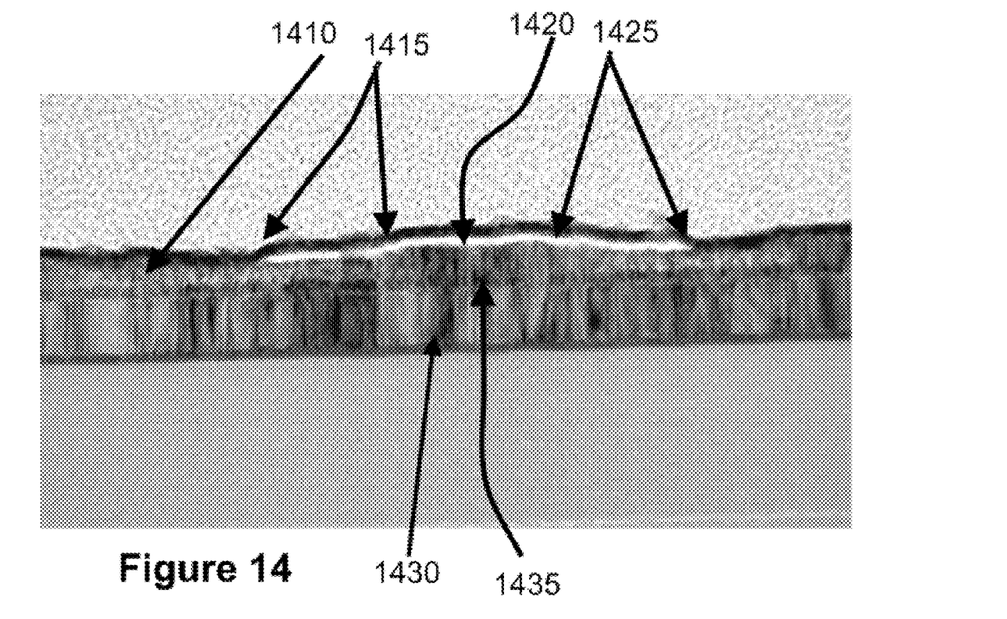
FIG. 14 is a cross-sectional view of a TEM image of a sample, in accordance with an embodiment of the present invention.

FIG. 14 depicts a Transmission Electron Microscopy (TEM) image of a media portion that was provided with shielding over some regions and was exposed in other regions. The white region identified as 1420 is residual resist; the dark layer disposed along the white region was a layer added for contrast, and which need not be added in a media article for actual usage. The area illustrated by arrow 1410 illustrates an area that was not protected, and hence was processed for selective Co removal, as shown by the comparative recess to the area to the right of 1410. Arrows 1415 demarcate an area of undercut where some removal of Co occurred even though that area was protected by resist. Arrows 1425 illustrate a similar situation to the right. Arrow 1435 illustrates that a central portion of the protected area was substantially unprocessed, such that the recording material initially deposited remains in a substantially unaltered state. Arrow 1430 identifies an area near the central protected region where the columnar grains of magnetic material remain intact, also showing that the processing did not disturb the configuration of this material. Thus, FIG. 14 illustrates that the desired formation of a dot of magnetic material, surrounded by non-magnetic material can be achieved on a surface of a media article.

FIG. 14 illustrates that the organic protection (1420) (e.g. resist) may not entirely prevent undercut (processing) of regions around the periphery of the resist. An extent of undercut can be greater than what would be expected from only intentional anodic processing, with a given current density and for a given duration (i.e., an amount of undercut does not correlate precisely to what would be expected purely from processing time and current density). This result can be attributed predominantly to a corrosion process in the "off time" between anodic removal of Co and rinsing and drying of the media portion (e.g. a disc). The interface Pt/CoPt induces a galvanic cell with $\Delta E_{corr}=E_{corr-Pt}-E_{corr-CoPt}$, which increases a corrosion rate of CoPt at these interfaces.

A solution for this problem involves mitigation of protons present at the Pt/CoPt interface formed during anodic removal. An example of such a solution is to transfer the anodized media (e.g. disc) to a well-stirred (e.g. ultrasonic agitation) bath with boric acid and water that has a pH of about 8, or a similar buffering solution.

Thus, the above-described aspects include the fabrication of patterned (or bit patterned or discrete track) media by anodic removal of Co from selected areas (e.g. unmasked areas) of a surface composed of a substantially uniform layer of an alloy of Co and Pt, such as a CoPtX alloy in an HCP orientation in order to form data storage domains (a.k.a. dots, or trenches). The anodic removal of Co from selected areas in order to define the dots or trenches allows a processed media article to begin with a generally uniform media storage layer, rather than one which also has materials designed to shield the dots or trenches from each other, such as a silicon dioxide material.

Also, the processed media can have the following characteristics. First, the material made non-magnetic during processing is recessed (e.g., 2 to 3 nm) from the magnetic dots or trenches, and fills the space between the dots or trenches. Therefore, usage of an additive filling, such as a filling with alumina, that often must be followed by Chemical Mechanical Polishing (CMP) may be rendered unnecessary, or may be reduced substantially.

Figure 15:
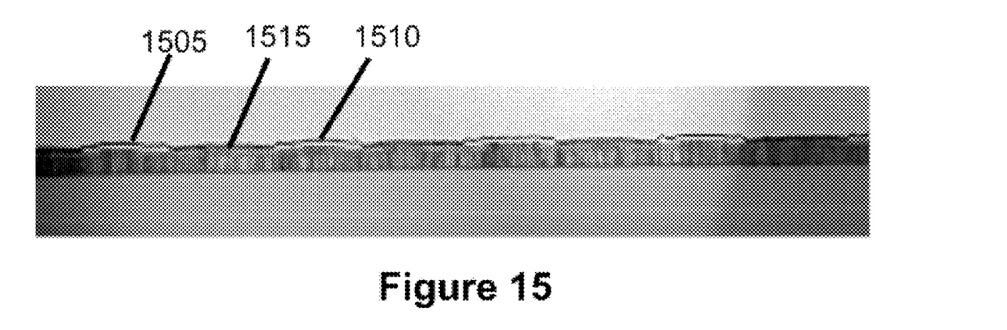
FIG. 15 is a cross-sectional view of patterned media after anodic removal processing with a DLC coating, in accordance with an embodiment of the present invention.

Second, the photoresist material, which served as a protective mask during formation of the CoPt or CoPtX dots or trenches, can be removed, and a DLC deposition can be made on the media article for final corrosion protection. In accordance with this description, FIG. 15 depicts a cross section of a processed article of media with a DLC coating. Dots 1505 and 1510 are identified as being separated by region 1515, which has been processed for selective removal of Co.

For clarity, the above description describes examples of anodic processing of a continuous surface of a CoPt alloy for removal of Co in selected regions of the surface. Other examples and implementations comprise using different alloys. Each alloy will have a more-noble component and a less noble component. Examples of the more-noble component include Pt, Pd, Ru, Rh, Ir, Os, and Au. Examples of the less-noble component include Co and Fe. Of course, other materials can be provided in the alloy, such as Cr, Cu, Ag, Ta, Ti, O, B and $TiO_2$.

It would be apparent from this disclosure that a pattern of resist can be provided on the media article to account for an expected amount of undercut that would result during processing, in order to achieve an end result of a desired size of recording domain, for a given set of processing conditions. It also would be apparent that the resist pattern is not limited to formation only of dots or islands, but can be provided in any of a variety of different patterns, such as circular tracks. Further areas that can be made to contain servo patterns or other servo information also can be provided according to this disclosure. As such, a person of ordinary skill would have understood embodiments according to this disclosure to comprehend any of these alternatives alone or in combination with other examples and disclosures.

Those of ordinary skill also may vary the composition of the recording layer, the selection of electrolyte, processing times, processing steps, electrode selection, and other variables, as demonstrated by the examples disclosed above, and according to further experiments and/or simulations in accordance with such disclosure, without varying from the scope of the invention as defined in the appended claims.

We claim:

1. A method comprising:
    establishing a layer stack overlying a substrate surface, the layer stack comprising at least one magnetic recording layer;
    shielding a first section of the recording layer, to establish a magnetic recording region; and
    exposing a second section of the recording layer to selective anodic removal of a first element from the second section, wherein
        the exposing comprises electrolytically removing ions from the first element by situating the at least one magnetic recording layer in a predetermined electrolyte in the presence of an electrode,
        the electrolyte comprises one of MCl, MBr, MI, $MNO_3$, $MHSO_4$, $M_2SO_4$, $MH_2PO_4$, $M_2HPO_4$, and $MClO_4$, wherein M comprises one of $Na^+$, $K^+$, and $NH_4^+$, and
        the exposing establishes a plurality of recording domains and a non-magnetic separating region.

2. The method as in claim 1, wherein the first element is Co.

3. The method as in claim 2, wherein, prior to the selective anodic removal, the recording layer comprises one of CoX, CoXY, CoXZ, and CoXYZ, wherein X is an element selected from a first group comprising Pt, Pd, Ru, Rh, Ir, Os, and Au, wherein Y is an element selected from a second group comprising Cr, and wherein Z is an element selected from a third group comprising Cu, Ta, Ti, O, B, Ag, and $TiO_2$.

4. The method as in claim 1, wherein the first element is Fe.

5. The method as in claim 4, wherein, prior to the selective anodic removal, the recording layer comprises one of FeX, FeXY, FeXZ, and FeXYZ, wherein X is an element selected from a first group comprising Pt, Pd, Ru, Rh, Ir, Os, and Au, wherein Y is an element selected from a second group comprising Cr, and wherein Z is an element selected from a third group comprising Cu, Ta, Ti, O, B, and Ag, and $TiO_2$.

6. The method as in claim 1, wherein the magnetic recording region is a perpendicular recording region of discrete track recording (DTR) media or bit patterned recording media (BPM).

7. The method as in claim 1, wherein the magnetic recording region is a hexagonal close-packed (hcp) structure.

8. The method as in claim 1, wherein the shielding the first section and the exposing the second section of the recording layer comprises patterning a photoresist or nano-imprint (NIL) resist to mask the first section from anodic removal of the first element, and to expose the second section of the recording layer surface to anodic removal of the first element.

9. The method as in claim 1, wherein performing the selective anodic removal of the first element from the second section comprises:
    causing the recording layer to function as an anode with respect to the electrode to establish a predetermined electrical potential between the recording layer and the electrode for a predetermined time, wherein the electrolyte and the electrical potential are selected to cause electrolytic removal predetermined ions from the second section of the recording layer surface.

10. The method as in claim 9, wherein the electrolytic removal of ions is performed to establish surfaces in the second section predominantly comprising a second element, wherein the second element is a more electrochemically noble element as compared to the first element.

11. The method as in claim 9, wherein, after anodic removal of ions, the exposed surfaces in the second section further comprise magnetically ineffective quantities of impurities, wherein the impurities comprise one or more of bromides and hydroxides of a more-noble element, and oxides of a less-noble element.

12. The method as in claim 9, wherein the electrolytic removal of ions is performed so that at least an area of the first section is substantially unmodified by the electrolytic removal of ions, while some ion removal occurs proximate a peripheral edge of the first section, the peripheral edge defined by a mask pattern.

13. The method as in claim 9, further comprising utilizing a predetermined electrolyte, a predetermined current density at which electrolytic removal of ions occurs, and a predetermined time during which electrolytic removal of ions occurs, to allow the area of the first section to remain substantially unaffected, including magnetically unaffected, during the electrolytic removal of ions.

14. The method as in claim 9, wherein the electrolytic removal of ions is employed for a time at least of enough duration to anodically remove Co ions or Fe ions to demagnetize the second section, and short enough to avoid extensive oxidation of an element in the second section selected from a group comprising Pt, Pd, Ru, Rh, Ir, Os, and Au.

15. The method as in claim 9, further comprising, after the electrolytic removal of ions, utilizing a proton neutralizing solution to neutralize a galvanic cell established proximate an interface between the first section and the second section.

16. The method as in claim 9, wherein the electrolytic removal of ions is employed for less than about 60 seconds at a current density of less than about 2 $mA/cm^2$.

17. The method as in claim 9, wherein the electrolytic removal of ions is employed for a time to reduce a magnetic capability in the second section by at least 50% as compared to a magnetic capability in the first section.

18. The method as in claim 9, further comprising inhibiting corrosion by one of electrodeposition of nonmagnetic material from the electrolyte, plating a nonmagnetic metal or metal alloy on a track after the anodic removal, utilizing remaining residual nonmagnetic material within a trench, and utilizing corrosion inhibitors with the track including benzotriazole and methyl-benzotriazole to inhibit corrosion before and after the anodic removal.

19. The method as in claim 1, wherein establishing the layer stack on the substrate surface further comprises forming, in overlying sequence, from the substrate surface: i.) a magnetically soft underlayer; ii.) an amorphous or crystalline, non-magnetic seed layer; and iii.) an interlayer structure for crystallographically orienting a layer of a perpendicular magnetic recording material situated on the underlayer, situated below the at least one magnetic recording layer.

20. A method comprising:

establishing a layer stack overlying a substrate surface, the layer stack comprising at least one magnetic recording layer;

shielding a first section of the recording layer, to establish a magnetic recording region; and exposing a second section of the recording layer to selective anodic removal of a first element from the second section, wherein the exposing comprises electrolytically removing ions from the first element by situating the at least one magnetic recording layer in a predetermined electrolyte in the presence of an electrode, the electrolyte comprises one of $MCl$, $MBr$, $MI$, $MNO_3$, $MHSO_4$, $M_2SO_4$, $MH_2PO_4$, $M_2HPO_4$, and $MClO_4$, wherein M comprises one of $Na^+$, $K^+$, and $NH_4^+$, and the exposing establishes a non-magnetic separating region.

21. The method as in claim 20, wherein, prior to the selective anodic removal, the recording layer comprises one of CoX, CoXY, CoXZ, and CoXYZ, wherein X is an element selected from a first group comprising Pt, Pd, Ru, Rh, Ir, Os, and Au, wherein Y is an element selected from a second group comprising Cr, and wherein Z is an element selected from a third group comprising Cu, Ta, Ti, O, B, Ag, and $TiO_2$.

22. The method as in claim 20, wherein the magnetic recording region is substantially uniform.

23. The method as in claim 20, wherein the exposing a second section of the recording layer to selective anodic removal of a first element from the second section establishes a plurality of recording domains.

* * * * *